United States Patent [19]
Ho et al.

[11] Patent Number: 5,313,192
[45] Date of Patent: May 17, 1994

[54] DEACTIVATABLE/REACTIVATABLE MAGNETIC MARKER HAVING A STEP CHANGE IN MAGNETIC FLUX

[75] Inventors: Wing Ho, Deerfield Beach, Fla.; Jiro Yamasaki, Fukuoka, Japan

[73] Assignee: Sensormatic Electronics Corp., Deerfield Beach, Fla.

[21] Appl. No.: 907,600

[22] Filed: Jul. 2, 1992

[51] Int. Cl.⁵ .............................................. G08B 13/24
[52] U.S. Cl. ................................. 340/551; 148/108; 340/572
[58] Field of Search ............... 340/572, 551; 148/108, 148/120

[56] References Cited

U.S. PATENT DOCUMENTS

| | | | |
|---|---|---|---|
| 2,988,466 | 6/1961 | Meiklejohn | 148/108 X |
| 4,298,862 | 11/1981 | Gregor et al. | 340/572 |
| 4,660,025 | 4/1987 | Humphrey | 340/572 |
| 4,745,401 | 5/1988 | Montean | 340/572 |
| 4,800,457 | 1/1989 | Kryder et al. | 360/113 |
| 4,945,339 | 7/1990 | Yamauchi et al. | 340/551 |
| 4,980,670 | 12/1990 | Humphrey et al. | 340/551 |
| 5,029,291 | 7/1991 | Zhou et al. | 340/551 |
| 5,121,106 | 6/1992 | Kataria et al. | 340/572 |
| 5,130,698 | 7/1992 | Rauscher | 340/551 |
| 5,146,204 | 9/1992 | Zhou et al. | 340/551 |
| 5,191,315 | 3/1993 | Cordery et al. | 340/572 |

*Primary Examiner*—Thomas Mullen
*Attorney, Agent, or Firm*—Robin, Blecker, Daley and Driscoll

[57] ABSTRACT

A marker for use in an electronic article surveillance system in which the marker comprises a magnetically soft component and exhibits a pinned wall hysteresis characteristic with a step change in flux at a threshold value of applied field and in which the marker further comprises a magnetically hard or semi-hard component integral with the soft component and whose magnetic state can be switched between activating and deactivating states to switch the marker between active and deactive states.

69 Claims, 6 Drawing Sheets

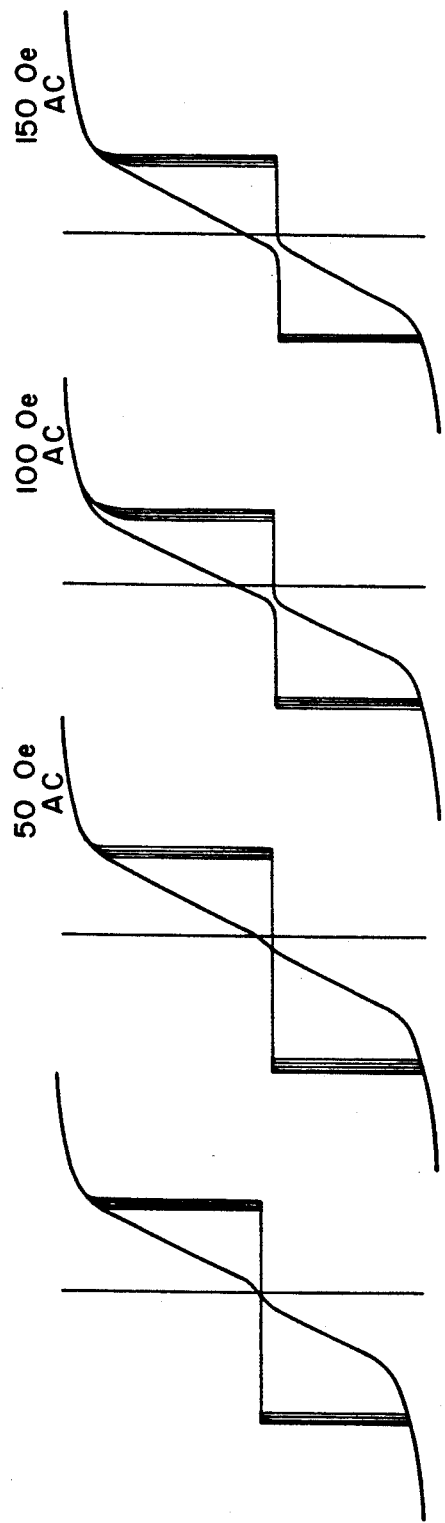
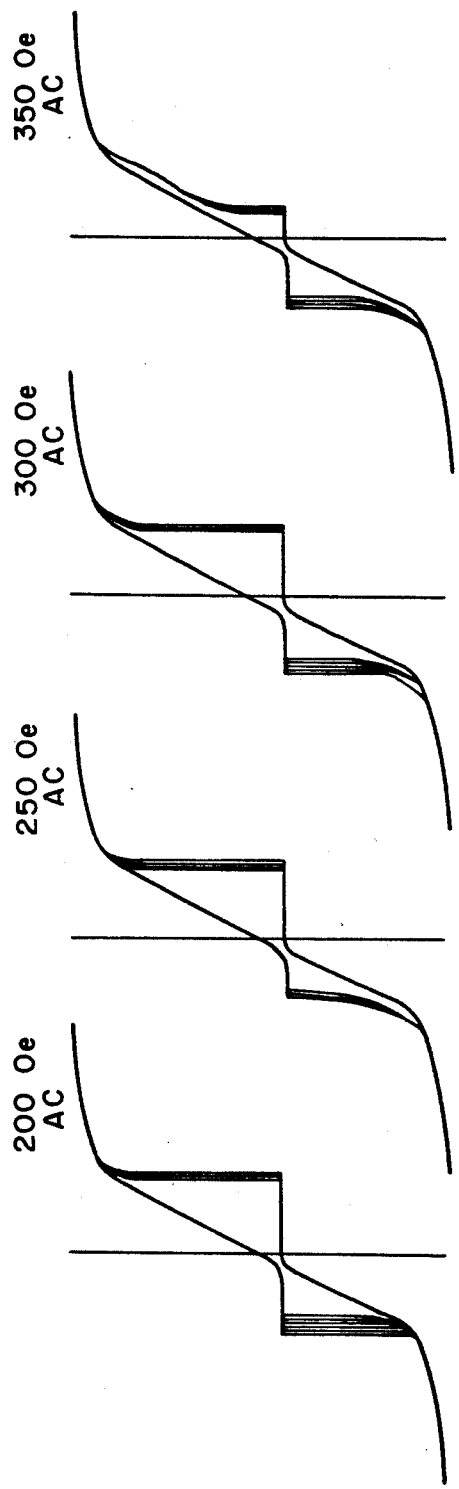

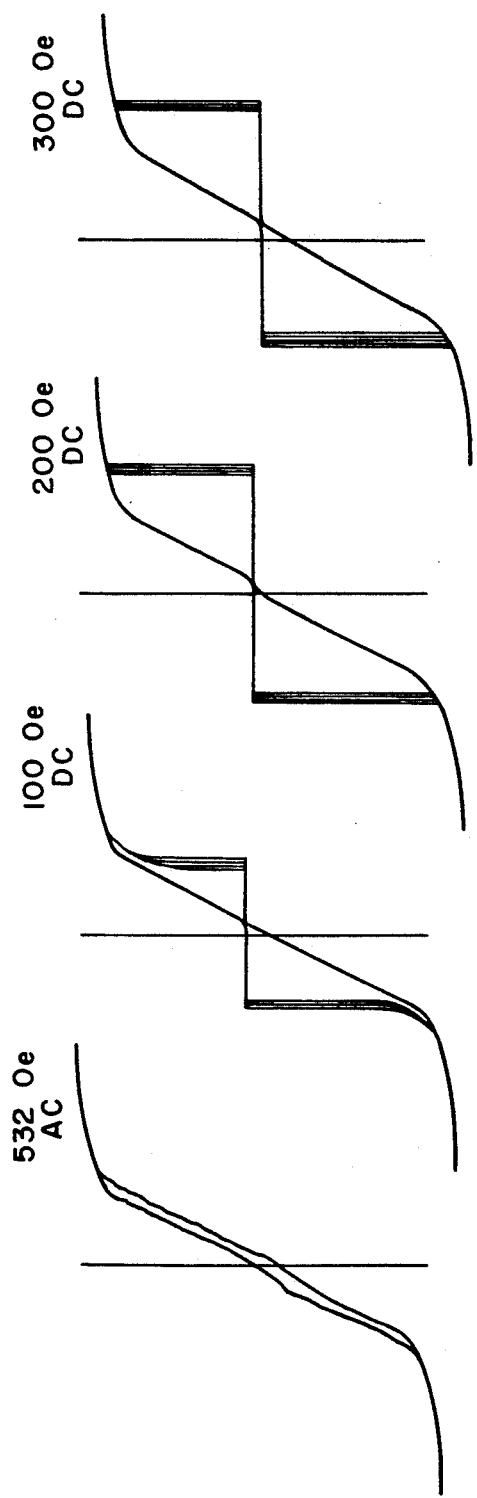
FIG. 6A  532 Oe AC
FIG. 6B  100 Oe DC
FIG. 6C  200 Oe DC
FIG. 6D  300 Oe DC
FIG. 6E  400 Oe DC
FIG. 6F  451 Oe DC
FIG. 6G  446 Oe DC

DEACTIVATABLE/REACTIVATABLE MAGNETIC MARKER HAVING A STEP CHANGE IN MAGNETIC FLUX

FIELD OF THE INVENTION

This invention relates to magnetic markers for use in electronic article surveillance (EAS) systems and, in particular, to improved magnetic markers and to methods, apparatus and systems for using and making such markers.

BACKGROUND OF THE INVENTION

In the design of EAS systems which use magnetic type markers, efforts have been made to enhance the uniqueness of the marker's response. One way that this has been accomplished is by increasing the high harmonic content in the voltage pulse generated by the magnetic flux reversal of the marker. As a result, the marker's response signal becomes more easily differentiated and detectable over the lower frequency background noise and magnetic shield noise and signals generated by other magnetic materials often found to exist in EAS systems.

A magnetic marker which exhibits a high degree of uniqueness is disclosed in U.S. Pat. No. 4,980,670, entitled "DEACTIVATABLE E.A.S. MARKER HAVING A STEP CHANGE IN FLUX", and assigned to the same assignee herein. In the marker of the '670 patent, the uniqueness of the response of the marker is attributable to the hysteresis characteristic of the material. In particular, the hysteresis characteristic exhibits step changes in flux at threshold values of the applied field.

The aforesaid hysteresis characteristic is brought about by conditioning the material of the marker so that it has a pinned domain wall configuration that remains pinned until the applied field reaches a predetermined threshold value, at which the pinned condition is overcome by the applied field causing a step change in flux. Such step change in flux provides a response signal from the marker which is rich in high harmonic content. The response signal is thus unique and, therefore, easily detectable.

The conditioning described in the '670 patent to achieve such pinned wall effect requires that the marker material be heated or annealed to pin the desired domain wall configuration. The '670 patent describes a number of soft amorphous transition metal-metalloid compositions ($Co_{75.2} Fe_{4.8} Si_2 B_{18}$; $Co_{74.26} Fe_{4.74} Si_3 B_{18}$; $Co_{74.24} Fe_{4.76} Si_2 B_{19}$) which can be used as the marker material. It also describes annealing temperature and time conditions.

When heating the soft (Co—Fe—Si—B) amorphous materials described in the '670 patent using certain of the described temperature and time conditions, the amorphous materials develop a crystallized inner layer of ferromagnetic material depleted of much of its glass forming metalloid and comprised substantially of crystallized Co with some Fe dissolved. This layer surrounds a bulk portion of material which comprises the original soft metal-metalloid composition. The resultant annealed material contains the desired pinned wall configuration and provides the step flux effect. In addition to the crystallized layer an outer surface layer of oxide is formed (e.g., $SiO_2$ and $B_2O_3$, i.e., a borosilicate). However, the oxide layer is non-magnetic.

Deactivation of the '670 marker is accomplished by exposing the marker to a high frequency or high amplitude AC magnetic field. In each case, additional domain walls are created in the marker and these walls remain in the marker after the marker is removed from the deactivating field. The presence of these additional domain walls prevents the original flux step from reoccurring. Moreover, once deactivated, the '670 marker cannot be easily reactivated. This prevents the marker from being reusable.

There are instances where it is advantageous to have markers which are capable of being deactivatable and also reactivatable.

It is therefore a primary object of the invention to provide an improved deactivatable marker.

It is another object of the present invention to provide an improved marker that it is reactivatable in addition to being deactivatable.

It is a further object of the present invention to provide a method of making an improved marker.

It is a further object of the present invention to provide an electronic article surveillance system incorporating the aforementioned improved magnetic marker.

It is yet a further object of the present invention to provide an electronic article surveillance system incorporating deactivation means, reactivation means, and the aforementioned improved magnetic marker.

SUMMARY OF THE INVENTION

In accordance with the principles of the present invention, the above and other objectives are realized by creating a marker that is similar to the marker of the '670 patent, but one that is more stable and controllable. The marker of the present invention is made by processing conditions as taught by the '670 patent. In addition, the marker has been subjected to predetermined magnetic fields during processing stages to enable the marker to be capable of being both deactivatable and also reactivatable. More particularly, the marker of the invention is selected to include a first component comprised of a soft magnetic material which constitutes the bulk of the marker. A second component comprised of a semi-hard or hard magnetic material is integral with the first component. The marker is conditioned such that the second component has activating and deactivating states for placing the marker in active and deactivated states, respectively. In the active state the marker exhibits a pinned wall hysteresis characteristic with step changes in flux as in the '670 patent marker. In the deactivated state, the marker exhibits a different hysteresis characteristic and, preferably, one having less pronounced step changes in flux or gradual changes in flux.

With this configuration for the marker, the marker is active when the second component is in its activating state and deactivated when the second component is in its deactivating state. By thus switching the second component between its activating and deactivating states, the marker can be switched between its active and deactivated states. A reusable marker with desired step changes in flux and capable of deactivation and reactivation is thereby realized.

As above-indicated, the marker of the invention can be fabricated by processing one or more materials in accordance with conditions set forth in the '670 patent in combination with predetermined magnetic field conditions. In one embodiment of the invention, a soft amorphous magnetic material is subjected to certain annealing conditions and to selected magnetic fields.

This processing produces a region of the marker which possesses semi-hard or hard magnetic properties defining the second component of the marker. The remaining bulk portion of the amorphous material having the soft magnetic properties defines the first component of the marker.

In this embodiment of the invention, the soft amorphous magnetic material is subjected to a first heating step which is carried out under temperature and time conditions specified in the '670 patent. Concurrently with or subsequent to this first heating step, a predetermined DC magnetic field is applied to the material. The presence of this field is not specified in the '670 patent. A second heating step is then carried out under temperature and time conditions set forth in the '670 patent. A marker having first and second components as above-described thereby results with the marker being capable of being deactivatable and reactivatable.

In another embodiment of the invention, a semi-hard or hard magnetic material is first deposited onto the surface of the soft amorphous magnetic material so as to be integral therewith. A predetermined field is then applied to the resultant composite material. The material is then subjected to annealing conditions set forth in the '670 patent to result in the marker of the invention.

In yet further aspects of the invention, an electronic article surveillance system and method utilizing the marker are also disclosed.

DESCRIPTION OF THE DRAWINGS

The above and other features and aspects of the present invention will become more apparent upon reading the following detailed description in conjunction with accompanying drawings, in which:

FIGS. 5A-5L illustrate representative hysteresis characteristics of the marker of FIGS. 1 and 2 when subjected to AC deactivation fields of different magnitude;

FIGS. 6A-6G illustrate representative hysteresis characteristics of the deactivated marker of FIGS. 1 and 2 when subjected to DC reactivation fields of different magnitude.

DETAILED DESCRIPTION OF THE INVENTION

Figure 1:
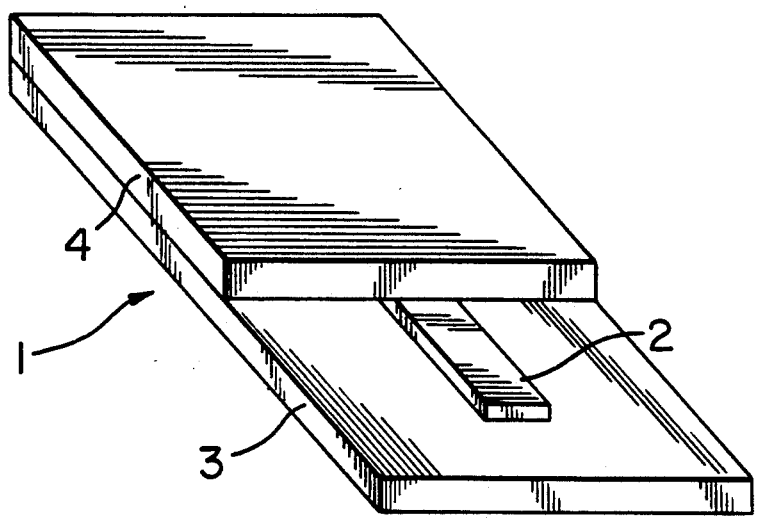
FIG. 1 shows a tag incorporating a magnetic marker in accordance with the principles of the present invention.

In FIG. 1, a tag 1 in accordance with the principles of the present invention is shown. The tag 1 comprises a magnetic marker 2 which is disposed between a substrate 3 and an overlayer 4. The undersurface of the substrate 3 can be coated with a suitable pressure sensitive adhesive for securing the tag 1 and magnetic marker 2 to an article to be maintained under surveillance. Alternatively, any other known arrangement can be employed to secure the tag 1 and magnetic marker 2 to the article.

Figure 2:
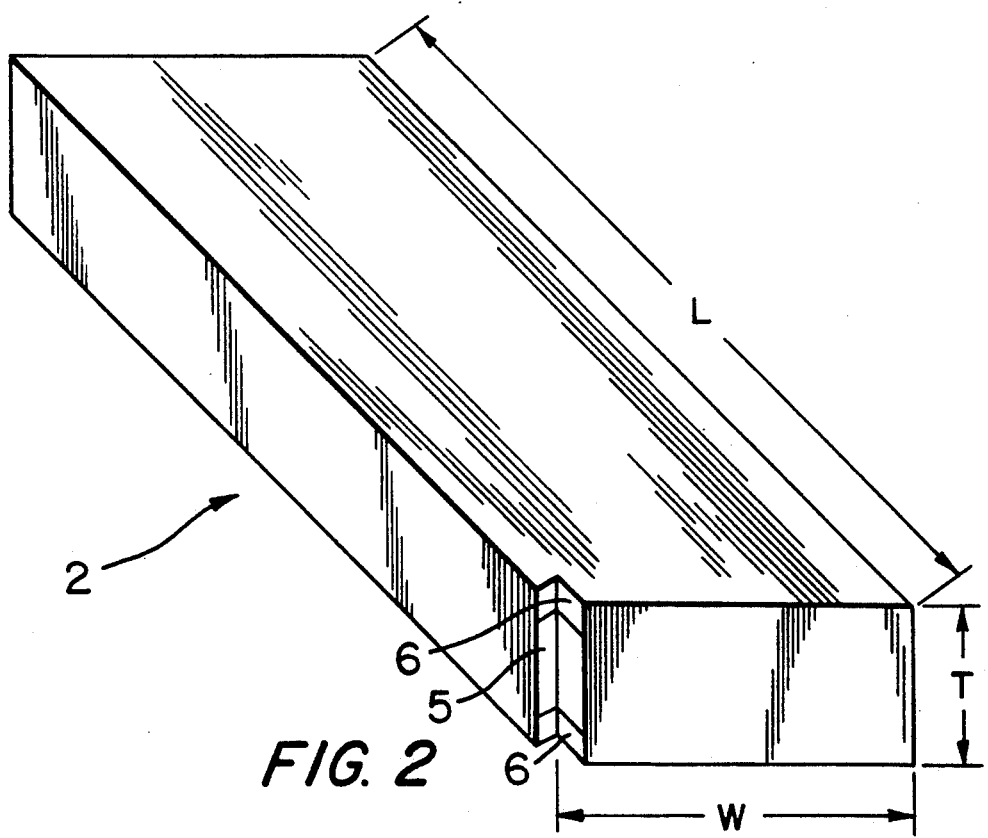
FIG. 2 illustrates the magnetic marker of FIG. 1 in greater detail.

FIG. 2 shows in more detail the magnetic marker 2 of FIG. 1. As shown, the magnetic marker 2 includes a first component comprised of a body of amorphous soft magnetic material 5. The marker also includes a thinner second component 6 formed integrally with the first component 5 and which is a semi-hard or hard layer having predetermined magnetic properties. The particular nature of component 6 will depend on the processing used to form the component as will be discussed below.

As shown, the component 6 extends over and surrounds the entire surface of the component 5. However, the component 6 can extend only over selected areas of the component 5, if desired.

Figure 3A:
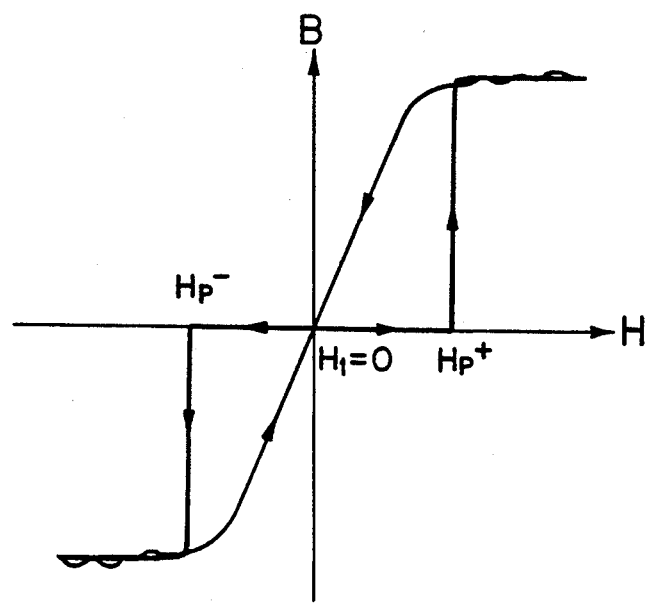
FIG. 3A shows the hysteresis characteristic of the marker of FIGS. 1 and 2.

As shown in FIG. 3A, the marker 2 is such as to have a pinned wall hysteresis characteristic like that of the '670 patent marker when the marker 2 is in an active state. Accordingly, when the marker 2 is active, it undergoes a regenerative step change in magnetic flux when the applied field passes through a preselected offset field value $H_1$ and reaches a predetermined threshold value $(H_p+, H_p-)$. The flux undergoes a gradual change as the applied field returns from beyond the threshold value toward the preselected offset field value. The flux of the marker undergoes substantially no change when the applied field passes from the preselected offset field value toward the predetermined threshold value.

Figure 3B:
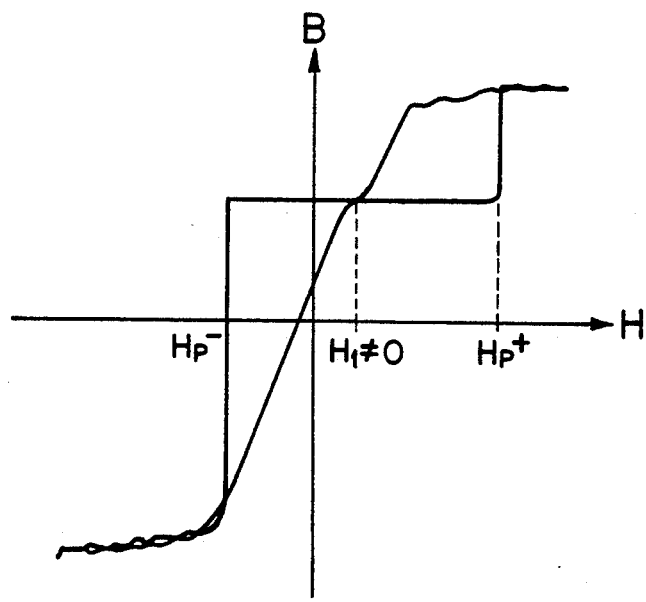
FIG. 3B shows a further hysteresis characteristic of the marker of FIGS. 1 and 2.

As illustrated in FIG. 3A the preselected offset field value $H_1$ is substantially equal to zero to minimize the excitation field necessary to enable the regenerative step changes in the material in both directions of applied field. However, as shown in FIG. 3B, it is possible to bias the marker by applying to it a small magnetic field below the saturation level of the material during formation of the pinned wall. In this case, $H_1$ is not zero and the predetermined threshold value is again shown by $H_p+$ and $H_p-$.

With the active marker 2 conditioned to have the pinned wall hysteresis characteristic, the marker generates a unique response signal when the marker is subjected to an alternating magnetic field which exceeds the threshold value. This makes the marker more easily detectable when used in an EAS system.

In accordance with the principles of the present invention, the marker 2 is further adapted to be easily deactivatable and reactivatable. Deactivation of the marker places the marker in a deactivated state in which its hysteresis characteristic is different from the aforesaid pinned wall hysteresis, characteristic. In particular, in the deactivated state, the marker hysteresis characteristic exhibits smaller step changes or only gradual changes in flux. Reactivation of the marker, in turn, returns the marker to its original pinned condition, causing the hysteresis characteristic to again exhibit its original step changes in flux.

Adapting the marker 2 to be deactivatable and reactivatable is accomplished by forming the marker 2 utilizing processing conditions of the '670 patent in conjunction with the application of preselected magnetic fields. This results in the component 6 exhibiting semi-hard or hard magnetic properties which enables the component to be prepared to take on activating and deactivating states. These states, in turn, cause the marker 2 to be in its active and deactivated states, respectively. Accordingly, by switching the component 6 between its activating and deactivating states, the marker 2 is similarly switched between its active and deactivated states.

The amorphous magnetic material used to develop the marker 2 can be any number of soft amorphous magnetic materials. Usable materials are amorphous transition metal-metalloid compositions which include transition metals selected from the group comprising Fe, Co and Ni, with the transition metals representing from 60% to 90% of the composition. Examples of materials found suitable are the following:

$Co_{74.26} Fe_{4.74} Si_{2.1} B_{18.9}$
$Co_{39.5} Fe_{39.5} Si_{2.1} B_{18.9}$

Other materials which may be used are amorphous transition metal-metal compositions. Usable transition metal-metal compositions include Co as a transition metal, with the Co representing 75% to 95% of the composition. Examples of these are the following:

$Co_{90} Zr_{10}$
$Co_{90} Zr_8 Nb_2$
$Co_{90} Zr_5 Nb_5$

In addition, transition metal-metal compositions with a few atomic percentage of glass forming elements can also be used. One example is $Co_{84} Nb_{12} B_4$.

In one embodiment of the invention, the marker 2 is fabricated using annealing conditions specified in the '670 patent to process a soft amorphous magnetic material to thereby result in an integrated structure comprised of the components 5 and 6. More particularly, the amorphous material develops a surface region which includes a magnetically hard or semi-hard crystallized inner layer, while the remaining bulk region of the material surrounded by the surface region remains substantially amorphous or uncrystallized. In this case, the crystallized semi-hard or hard inner layer defines the component 6, while the bulk region defines the component 5.

The particular temperature and time used for the above anneal will depend upon a number of factors, including the particular amorphous material used and the thickness desired for the component 6. Generally, lower temperatures will require longer annealing times while higher temperatures will require shorter annealing times. In selecting the annealing time, one should be guided by the fact that shorter durations prevent embrittlement of the material, while longer durations allow better control over the processing. In addition, the thickness of component 6 will be determined by the annealing conditions which will also affect the threshold value at which the marker undergoes its regenerative step change.

Once the annealing time is selected, the upper temperature limit usable for the anneal will be governed by the temperature at which crystallization occurs throughout the bulk of the amorphous material. Bulk crystallization should be avoided to allow further processing to realize the desired pinned wall hysteresis characteristic for the active marker as discussed below.

Also, lower temperatures for the anneal have to be weighed against mass production considerations. Since mass production typically requires a large heating area defined by many markers to be brought to the desired anneal temperature and also for this temperature to be maintained for the desired anneal time, lower temperatures may increase processing time and, thus, slow production.

It is also desirable that the first annealing be conducted so that component 6 is relatively thin because the growth of component 6 is at the expense of component 5. The reduction of the volume of component 5 reduces the signal output of the remaining material. Thus, it is beneficial that the component 6 should be less than about 1 micron in thickness, in cases where the thickness of the component 5 of the marker 2 is in the tens of micron range.

The annealing process is also preferably performed in an environment to promote growth of the crystallized layer. A typical environment might be air. However, an environment of nitrogen or other gases or a mixture of gases can be used to prevent embrittlement and further control growth of the crystallized layer.

During the procedure to form the component 6 or after the procedure has been completed and the material cooled to room temperature, the material is further conditioned to prepare the component 6 for its activating state. One way of accomplishing this is to apply a preselected magnetic DC field to the material. A usable field might be a DC field applied along the length of the material and of sufficient magnitude to saturate or substantially saturate the crystallized layer. Typically, a higher field magnitude will be needed if the field is applied after the anneal is finished rather than during the annealing process. After this saturating field is removed, the component 6 will retain its substantially magnetized activating state with its level of magnetization at its remanence level.

Another way of applying the desired magnetic field to the amorphous material is by using a multipole magnet, for example, with alternating pole spacing of 0.19" (a pole density of 5.3 poles/inch) and surface field strength of 400 Oe. In this case, the crystallized layer 6 will take on the field pattern impressed by the multipole magnet. This will also place component 6 in the activating state.

With the component 6 in its activating state, the material is further processed using annealing conditions of the '670 patent. This provides stable pinned walls in the marker which result in an active marker which exhibits a hysteresis characteristic with a pinned wall and an abrupt step change as in the '670 patent.

The selected heating temperature and time used in this second annealing must also be such that substantially no crystallization occurs in the bulk of the amorphous material defining the component 5. The heating temperature/time profile should also include significant time at an elevated temperature, but below the Curie temperature Tc of the amorphous material, in order to be able to induce the required anisotropy for pinning the domain walls. It should further be noted that for a given anneal temperature, a shorter duration for the anneal can result in a lower pinning threshold.

During this second annealing, the environment should be kept free of magnetic fields if the hysteresis characteristic is to have an offset field value $H_1$ of substantially zero. Otherwise, if a bias field is present, the hysteresis characteristic will be shifted. Also, the annealing atmosphere may be air, nitrogen or other gases or mixtures thereof.

After forming the aforesaid stable pinned walls in the marker with the component 6 in its activating state, if desired, the component 6 can be placed in a deactivating state (e.g., by demagnetizing the crystallized layer when the activating state of the layer corresponds to the layer being magnetized) which simultaneously alters the pinned wall condition. This causes the hysteresis characteristic of the marker to change so that it exhibits reduced step changes or a gradual change in flux, thereby placing the marker in its deactivated state. By then returning the component 6 to its activating state (e.g., by again magnetizing the crystallized layer when the activating state of the layer corresponds to the layer being magnetized, the pinned walls are returned to their original stable condition, thereby returning the original step change hysteresis characteristic. The marker 2 is thereby again made active.

In one example of the markers of the invention, the markers were developed by processing amorphous materials having the formulation $Co_{74.26}Fe_{4.74}Si_{2.1}B_{18.9}$. This processing was carried out for four different samples at a temperature of 380° C. for 15, 30, 45 and 60 minutes, respectively, and resulted in the formation of the integrated components 5 and 6. The crystallized component 6 was formed as a ferromagnetic, semi-hard inner layer comprised primarily of crystallized Co and Fe. Over this layer was an outer amorphous non-magnetic layer of oxidized Si and B. The oxidized layer is believed to play no role in the magnetic characteristic of the marker.

During this first annealing procedure, the component 6 was placed in its activating state by applying a 60 Oe DC field along the length of the marker to magnetize the crystallized layer.

Then a second heating procedure was carried out by heating the marker material at a temperature of 400° C. for 5 minutes in the absence of an applied magnetic field, (i.e., in zero field). The material was then cooled. This resulted in a marker capable of being deactivatable and reactivatable with the desired stable and controllable pinned wall characteristic with a controllable regenerative step change threshold.

In another example, deactivatable reactivatable markers were made by heating the same material at a temperature of 380° C. for periods of time from 15–90 minutes to form the crystallized layer 6. The best results were obtained for periods from 15 minutes to 60 minutes. After the material was cooled, the component 6 was placed in its activating state by applying a 400–500 Oe DC field along the length of the material to magnetize the layer. Thereafter, the marker was heated at 400° C. for 5 minutes in a zero field, and then cooled to produce the desired marker.

While the above provides examples of specific temperatures and times for first and second heating procedures which have been used to form the markers of the invention, the preferred temperatures for the first annealing range from 350° C. to 450° C. for durations from 2 minutes to 120 minutes. For the second anneal the preferred range of temperature is 400° C. to 420° C. for a time of between 1 minute to 5 minutes. Other times and temperatures can be determined and utilized depending on the composition of the base amorphous material. However, when heating the marker it is important not to exceed the crystallization temperature of the base material.

In another embodiment of the invention, the component 6 is formed integrally with the component 5 of the marker 2 by a deposition procedure. In this embodiment of the invention, a semi-hard or hard magnetic material forming the component 6 is deposited directly onto a soft magnetic material forming the component 5. Usable semi-hard or hard magnetic materials are sold under the trademarks "Vicalloy" or "Crovac" manufactured by Vacuumschmeltze or selective rare-earth transition metal alloy magnets. The soft magnetic material can be the amorphous materials discussed above.

In the embodiment of the invention where the component 6 has been deposited on the component 5, the component 6 is placed in its activating state by apply a DC field to saturate the component 6 and then pinned walls are formed in the marker to establish the pinned wall hysteresis characteristic. These steps preferably also use annealing procedures of the '670 patent and the application of preselected fields a discussed above. However, higher fields may be required to place the component 6 in its activating state depending upon the coercivity of the deposited hard or semi-hard material.

The preselected pinning threshold at which the regenerative step change in flux of the active marker occurs can be controlled in a number of ways. One way is by selecting the proper composition of the amorphous material, where the component 6 is formed as a crystallized layer of such material, or by proper selection of the material of the deposited layer where the deposition procedure is used. Another way is by appropriate selection of the time and temperature of the annealing. By these means the component 6 is formed as a crystallized layer.

In forming the magnetic marker 2, it is preferable that the marker dimensions be established before the marker is processed to develop the pinned wall hysteresis characteristic. Thus, any trimming or cutting of the marker to the desired size should be effected prior to such processing.

An alternate procedure which allows cutting after the pinned walls are formed in an amorphous material is to process the regions where cutting or trimming is to take place such that the cutting and/or trimming do not appreciably alter the already established pinned wall and other magnetic properties in the adjacent areas. Thus, for example, regions of the amorphous material which are to be cut or trimmed can be treated so they become crystallized throughout their bulk. Cutting in the bulk crystallized region will minimally affect the domain walls and other magnetic properties established in the active pinned wall areas. Crystallizing the amorphous material in this way can be accomplished by heating the material using a high power laser or by contacting the material with a hot roller with protruding ridges.

Figure 4:
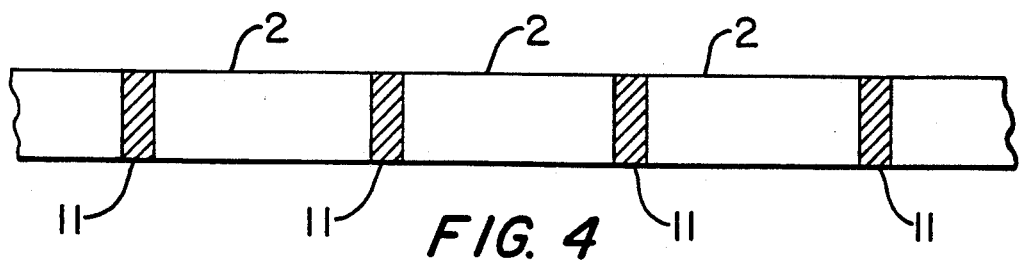
FIG. 4 illustrates a continuous amorphous material used to form the marker of FIGS. 1 and 2.

FIG. 4 illustrates adapting the above principles to a process for forming individual markers 2 from a continuous strip of material. As shown, individual markers 2 which have been established by bulk continuous processing of the amorphous strip are separated by narrow crystallized bulk regions 11 which typically might be 1.5 mm in width. The regions 11 magnetically isolate the markers 2, so that cutting in these regions to separate the individual markers from the strip does not significantly alter the magnetic properties of the individual markers. Generally, the wider the regions 11, the less the magnetic coupling between adjacent markers and the more consistent will be the magnetic properties of the individual markers when separated from the continuous strip.

In fabricating the marker 2, in order to optimize the response of the marker per unit volume of the marker material, the cross sectional area of the marker 2 has to be adjusted for different marker materials according to the marker length and the wall pinning threshold. Generally, for optimum use of the marker material, the wall pinning threshold should exceed the demagnetizing field developed as a result of the finite length of the marker.

When the length of the marker is short, i.e., less than about 50 mm, the demagnetizing field is appreciable and may likely exceed the pinning threshold. In such cases, the cross sectional area of the marker can be reduced to reduce the demagnetizing field, and therefore, bring it closer to the wall pinning threshold. This better utilizes all the marker material in generating a response although a lower signal level will be generated.

Figures 5I, 5J, 5K, 5L:
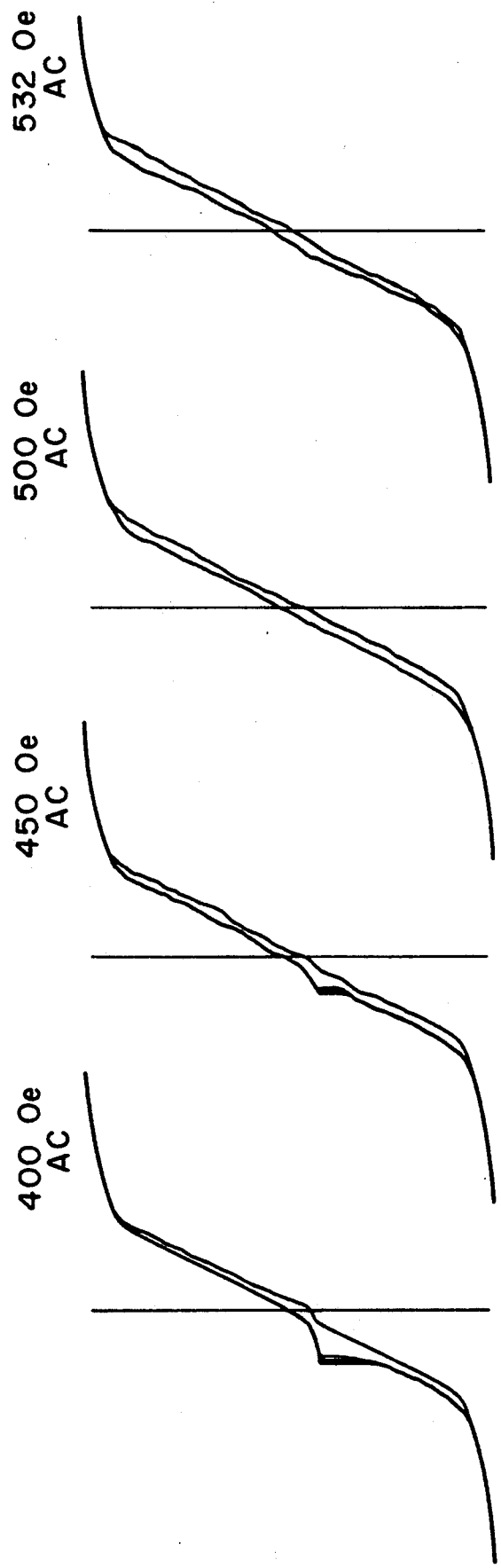

FIG. 5A shows the hysteresis characteristic of an active marker 2 made in accordance with the invention and whose component 6 has been placed in its activating state by being magnetized. To deactivate this marker, it is subjected to a decaying AC degaussing field. FIGS. 5B-5L show the hysteresis characteristics of the marker after the marker has been subjected to respective different AC degaussing fields to demagnetize the component 6 and place it in its deactivating state, thereby rendering the marker 2 deactivated. FIGS. 5B-5L correspond to characteristics of the marker 2 resulting from degaussing fields having a frequency of 10 Hz and initial magnitudes starting with 50 Oe for FIG. 5B and showing the results up to 532 Oe in FIG. 5L.

As can be seen from these figures, the magnitude of the degaussing field may be selected to deactivate the marker. Here, the wall pinning threshold of the marker hysteresis characteristic is substantially eliminated when a degaussing field having an initial level of 500 Oe is used. Accordingly, when an AC degaussing field of such initial level or above is applied to the marker 2, the component 6 of the marker 2 is sufficiently demagnetized so that no wall pinning is present and the marker becomes deactivated. Upon removing the degaussing field, the component 6 of the marker remains demagnetized and, therefore, the marker 2 remains deactivated.

An alternate procedure for placing the component 6 in its deactivating state is to use a multipole magnet, instead of an AC degaussing field. A typical magnet might be a flexible multipole magnet with 5.3 poles/in. pole density and a peak field of 400 Oe. This magnet would typically be placed on the surface of component 6 to alter the magnetic state of the component, thereby rendering the marker 2 deactivated.

To return the marker 2 to its active state, the component 6 is again magnetized. This can be achieved by recharging the component as by applying a longitudinal DC field to the marker. FIG. 6A shows the hysteresis characteristic of the deactivated marker 2 and FIGS. 6B-6G show the hysteresis characteristics of the marker after subjecting the marker to different recharging fields. FIGS. 6B-6G correspond to the responses of the marker after recharging DC fields of 100, 200, 300, 400, 451 and $-446$ Oe, respectively have been applied.

As can be seen, the wall pinning threshold of the marker substantially returns at 200 Oe. Accordingly, when a DC field above about 200 Oe is applied to the marker 2, the component 6 becomes sufficiently saturated to restore the original wall pinning of the marker, thereby returning the marker to its active state. Upon removing the DC field, the component 6 remains magnetized and, therefore, the marker 2 remains active.

Variation of the deactivation and reactivation characteristics of the marker 2 from those described above can be achieved by establishing in the component 6 different magnetic conditions corresponding to the activating state of the component. For example, as above-indicated, a multipole magnet can be placed in contact with the surface of the component 6 to give the component a magnetic configuration impressed by the field given by the multipole magnet. The magnetic configuration of the component 6 can then be changed by using either an AC field or a DC field (e.g., a DC field of 150 Oe), thereby changing the component 6 to its deactivating state and rendering the marker deactivated.

The field level at which the marker 2 is deactivated or reactivated depends on the coercivity of the component 6. Different deactivation and reactivation field levels can be obtained by controlling the coercivity of component 6. In particular, by varying the annealing conditions for formation of the component 6 and/or the marker 2 composition, the component 6 can be made to have different coercivities.

An improved deactivatable marker 2 can also be realized by forming the component 6 of the marker such that the component is substantially demagnetized in the activating state of the component. This can be accomplished by applying an AC field of hundreds of Oersteds to the marker 2 during the first annealing procedure and throughout the subsequent cooling stage or subsequent to the cooling stage to form the component 6. The marker 2 can then be deactivated by magnetizing the component 6 to place the component in its deactivating state.

Figure 7:
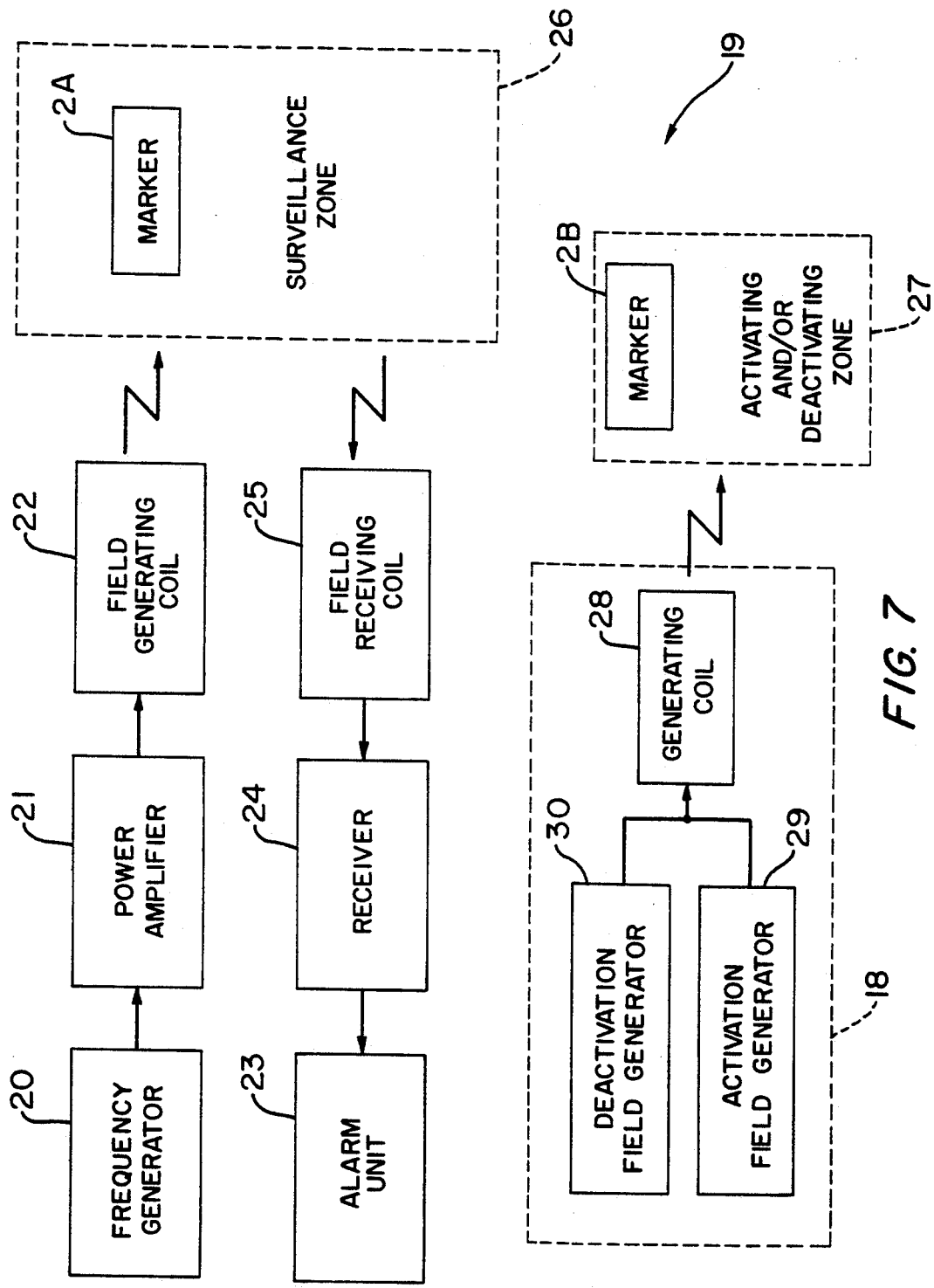
FIG. 7 illustrates an article surveillance system usable with the marker of FIGS. 1 and 2.

FIG. 7 illustrates use of a marker 2 in an article surveillance system 19 provided with an activation/deactivation unit 18. More particularly, the system 19 includes an interrogation or surveillance zone, e.g., an exit area of a store, indicated by the broken lines at 26. A marker 2A having attributes similar to the marker 2 of the invention is shown attached to an article in the surveillance zone 26.

The transmitter portion of the system comprises a frequency generator 20 whose output is fed to a power amplifier 21 which, in turn, feeds a field generating coil 22. The latter coil establishes an alternating magnetic field of desired frequency in the surveillance zone 26. The amplitude of the field will, of course, vary depending upon system parameters, such as coil, interrogation zone size, etc. However, the amplitude must exceed a minimum field so that markers 2A in the surveillance zone 26 will see a field above the aforementioned marker threshold.

The receiving portion of the system includes field receiving coil 25, the output of which is applied to a receiver 24. When the receiver detects predetermined perturbations, such as a particular harmonic content, in signals received from coils 25 in a prescribed range and resulting from the marker 2A, the receiver furnishes a triggering signal to alarm unit 23 to activate the alarm.

A second marker 2B also having attributes similar to the marker 2 of the invention is shown in an activating and/or deactivating zone 27 established by the activating/deactivating unit 18. To deactivate the marker 2B, the deactivation field generator 30 drives the generating coil 28 which establishes an AC degaussing field through the zone 27. The initial amplitude of the AC degaussing field must exceed a minimum level so that the marker 2B in the zone will see a degaussing field of sufficient level to demagnetize the component 6 of the marker, thereby deactivating the marker. During the deactivation process the activation field generator 29 is inactive.

It is also possible to activate markers that have been previously deactivated. To activate the marker 2B, the activation field generator 29 drives the generating coil 28 which establishes a DC pulse field throughout the zone 27. The amplitude of the activation field must exceed a minimum level so that the marker 2B in the zone will see a DC pulse field of sufficient level to magnetize the component 6 of the marker, thereby activating the marker 2B as above-described. During the activation process the deactivation field generator 30 is inactive.

As can be appreciated, the activation/deactivation unit 18 can be two separate units. A first unit can be used for activating markers and the second unit for deactivating markers.

It should be noted that the terms soft, hard and semi-hard have been used in the above-discussion to describe the magnetic properties of the materials employed in fabricating the markers of the invention. As used herein, the term soft magnetic material has been used to mean a magnetic material whose coercivity is below about 10 Oe, the term semi-hard magnetic material has been used to mean a magnetic material whose coercivity is above about 10 Oe and below about 500 Oe and the term hard magnetic material has been used to mean a magnetic material whose coercivity is above about 500 Oe.

It is thus evident that by following the principles of the invention a unique marker is provided with improved features. The marker has all the features of the marker of the '670 patent with its pinned wall characteristic and a step change in hysteresis characteristic. In addition, the marker is easily made and is a more stable and controllable deactivatable marker that is also capable of being reactivatable. Moreover, the threshold value at which the step change occurs is controllable and by selecting the proper coercivity of the crystallized layer on the marker, the activating DC field is also controllable.

The marker of the invention when coordinated into an electronic article surveillance system provides a system that is more flexible and reliable than prior art systems with fewer false alarms.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A marker for use in an article surveillance system in which an applied alternating magnetic field is established in a surveillance zone and an alarm is activated when a predetermined perturbation to said field is detected, said marker comprising:
    a) a marker element including first and second integral components, said first component comprising a soft magnetic material and said second component comprising a hard or semi-hard magnetic material;
    b) said marker element having an active state wherein said marker element exhibits a hysteresis characteristic upon being subjected to the applied alternating magnetic field such that the magnetic flux of said marker element undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value;
    c) said marker element having a deactivated state wherein said marker element exhibits a different hysteresis characteristic from the hysteresis characteristic exhibited by said marker element in the active state;
    d) said second component of said marker element having an activating state which places said marker element in said active state and a deactivating state which places said marker element in said deactivated state;
    whereby the marker element is switched between said active state and said deactivated state by switching said second component between said activating state and said deactivating state, respectively.

2. A marker in accordance with claim 1 wherein:
said marker element when in said deactivated state exhibits a hysteresis characteristic with step changes in flux which are less than the step changes exhibited by said marker element when in the active state, or exhibits a hysteresis characteristic with only gradual changes in flux.

3. A marker in accordance with claim 2 wherein:
said activating state of said second component corresponds to a first magnetic state of said second component;
and said deactivating state of said second component corresponds to a second magnetic state of said second component.

4. A marker in accordance with claim 3 wherein:
said first magnetic state is one where the second component is magnetized substantially to saturation;
and said second magnetic state is one where the second component is substantially demagnetized.

5. A marker in accordance with claim 1 wherein:
said hard or semi-hard magnetic material of said second component comprises a layer which surrounds said first component.

6. A marker in accordance with claim 1 wherein:
said second component has a thickness which is less than about 1 um.

7. A marker in accordance with claim 1 wherein:
said preselected offset field value is substantially zero and said hysteresis characteristic of said marker element in said active state:
A) exhibits a negligible flux change for a first direction of said applied field having a value which is up to said predetermined threshold value;
B) exhibits a first-direction step change in flux at the first direction value of the applied field equal to said predetermined threshold value;
C) exhibits a gradual decrease in flux for a decrease in the first direction value of the applied field from beyond said predetermined threshold value;
D) exhibits a negligible flux change for a second direction of said applied field having a value which is up to said predetermined threshold value, said second direction being opposite said first direction;
E) exhibits a second-direction step change in flux at the second direction value of the applied field equal to said predetermined threshold value; and F) exhibits a gradual decrease in flux for a decrease in the second direction value of said applied field from beyond said predetermined threshold value.

8. A marker in accordance with claim 1 wherein:
said soft magnetic material comprises a soft amorphous magnetic material;
and said second component comprises a crystallized region of said soft amorphous magnetic material.

9. A marker in accordance with claim 8 wherein:
said soft amorphous magnetic material comprises a transition metal-metalloid composition.

10. A marker in accordance with claim 9 wherein:
said transition metal-metalloid composition comprises a transition metal which represents 60%-90% of said composition.

11. A marker in accordance with claim 10 wherein:
said transition metal-metalloid composition comprises one or more transition metals selected from the group comprising Fe, Co, and Ni.

12. A marker in accordance with claim 11 wherein:
said transition metal-metalloid composition is essentially given by the formula $Co_{74.26}Fe_{4.74}Si_{2.1}B_{18.9}$.

13. A marker in accordance with claim 9 wherein:
said transition metal-metalloid composition is essentially given by the formula $Co_{39.5}Fe_{39.5}Si_{2.1}B_{18.9}$.

14. A marker in accordance with claim 1 wherein:
said soft magnetic material comprises a transition metal-metal composition.

15. A marker in accordance with claim 14 wherein:
said transition metal-metal composition comprises Co in an amount that is about 75-95% of said composition.

16. A marker in accordance with claim 15 wherein:
said transition metal-metal composition is selected from the following group of compositions:
$Co_{90}Zr_{10}$
$Co_{90}Zr_8Nb_2$
$Co_{90}Zr_5Nb_5$ 17. A marker in accordance with claim 1 wherein:
said soft magnetic material is amorphous;
and said semi-hard or hard magnetic material is a deposit on said soft amorphous magnetic material.

18. A marker in accordance with claim 1 wherein:
said marker element when in said active state has domains whose walls are in a pinned state and remain in a pinned state during the time from when the applied field passes through the preselected offset field value toward and until applied field reaches the predetermined threshold value at which the walls are released from the pinned state causing said regenerative step change in magnetic flux, the walls returning to the pinned state at the time when the applied field reaches the preselected offset field value after passing through the predetermined threshold value
and said marker element when in said deactivated state has domains whose walls are inhibited from assuming the pinned state.

19. A marker for use in an article surveillance system in which an applied alternating magnetic field is established in a surveillance zone and an alarm is activated when a predetermined perturbation to said field is detected, said marker comprising:
a) a marker element including first and second integral components, said first component comprising a soft magnetic material and said second component comprising a hard or semi-hard magnetic material made from the first component;
b) said marker element having an active state wherein said marker element exhibits a hysteresis characteristic upon being subjected to the applied alternating magnetic field such that the magnetic flux of said marker undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value;
c) said second component being substantially magnetized to place the marker element in its active state.

20. A marker in accordance with claim 19 wherein said predetermined threshold value depends upon the composition selected for the material of the first component.

21. An electronic article surveillance system for detecting the presence of an article in an interrogation zone comprising:
means for generating an applied alternating magnetic interrogation field in the interrogation zone, the magnitude of said interrogation field in said interrogation zone exceeding a predetermined threshold value; and
a marker secured to the article, the marker comprising: a) a marker element including first and second integral components, said first component comprising a soft magnetic material and said second component comprising a hard a semi-hard magnetic material; b) said marker element having an active state wherein said marker element exhibits a hysteresis characteristic upon being subjected to said applied alternating magnetic field such that the magnetic flux of said marker element undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value; c) said marker element having a deactivated state wherein said marker element exhibits a different hysteresis characteristic from the hysteresis characteristic exhibited by said marker element in the active state; d) said second component of said marker element having an activating state which places said marker element in said active state and a deactivating state which places said marker element in said deactivated state; whereby the marker element is switched between said active state and said deactivated state by switching said second component between said activating state and said deactivating state, respectively;
and receiver means for detecting the presence of the marker when the marker element is in the interrogation zone and while the marker element is in the active state by detecting perturbations of the interrogation field.

22. A system in accordance with claim 21 wherein:
said activating state of said second component corresponds to a first magnetic state of said second component;
and said deactivating state of said second component corresponds to a second magnetic state of said second component.

23. A system in accordance with claim 22 further comprising:
first means for changing the magnetic state of said second component from said first magnetic state to said second magnetic state.

24. A system in accordance with claim 23 wherein:
said first magnetic state of said second component is one in which said second component is substantially magnetized by applying a DC magnetic field to said marker;
and said first means includes means for substantially demagnetizing said second component to place said second component in said second magnetic state.

25. A system in accordance with claim 24 wherein:
said demagnetizing means applies one of an AC degaussing field and a field from a multipole magnet to said marker.

26. A system in accordance with claim 25 wherein:
said AC degaussing field has an initial amplitude equal to or greater than 500 Oe.

27. A system in accordance with claim 23 wherein:
said first magnetic state of said second component is a magnetic state developed by bringing a multipole magnet adjacent to said marker;
and said first means comprises means for applying one of an AC degaussing field and a DC field to said marker.

28. A system in accordance with claim 23 further comprising:
second means for changing the magnetic state of said second component from said second magnetic state to said first magnetic state.

29. A system in accordance with claim 28 wherein:
said second means comprises means for applying a DC field to said marker.

30. A system in accordance with claim 29 wherein:
said DC field is equal to or greater than 200 Oe.

31. A system in accordance with claim 21 wherein:
said marker element when in said active state has domains whose walls are in a pinned state and remain in a pinned state during the time from when the applied field passes through the preselected offset field value toward and until the applied field reaches the predetermined threshold value at which the walls are released from the pinned state causing said regenerative step change in magnetic flux, the walls returning to the pinned state at the time when the applied field reaches the preselected offset field value after passing through the predetermined threshold value;
and said marker element when in said deactivated state having domains whose walls are inhibited from assuming the pinned state.

32. A method of making a marker for use in an article surveillance system, the marker comprising: a) a marker element including first and second integral components, said first component comprising a soft magnetic material and said second component comprising a hard or semi-hard magnetic material; b) said marker element having an active state wherein said marker element exhibits a hysteresis characteristic upon being subjected to an applied alternating magnetic field such that the magnetic flux of said marker element undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value; c) said marker element having a deactivated state wherein said marker element exhibits a different hysteresis characteristic from the hysteresis characteristic exhibited by said marker element in the active state; d) said second component of said marker element having an activating state which places said marker element in said active state and a deactivating state which places said marker element in said deactivated state; whereby the marker element is switched between said active state and said deactivated state by switching said second component between said activating state and said deactivating state, respectively, the method comprising the steps of:
processing one or more materials in a first step to form said first and second components such that said second component is in said activating state;
and processing said formed first and second components in a second step to establish said hysteresis characteristic exhibited when the second component is in the activating state.

33. A method of making a marker in accordance with claim 32 wherein:
said first processing step comprises: forming said first and second components from said one or more materials; and establishing in said second component said activating state;
and said establishing step occurs concurrently with or subsequent to said forming step.

34. A method of making a marker in accordance with claim 33 wherein:
said soft magnetic material comprises an amorphous transition metal-metal composition.

35. A method of making a marker in accordance with claim 34 wherein:
said transition metal-metal composition comprises Co in an amount that is about 75-90% of said composition.

36. A method of making a marker in accordance with claim 35 wherein:
said transition metal-metal composition is selected from the following group of compositions:
$Co_{90}Zr_{10}$
$Co_{90}Zr_8Nb_2$
$Co_{90}Zr_5Nb_5$.

37. A method of making a marker in accordance with claim 32 wherein:
said second processing step occurs subsequent to said first processing step and includes establishing domain walls in said marker element which remain in a pinned state during the time from when the applied field passes through the preselected offset field value toward and until said applied field reaches said predetermined threshold value.

38. A method of making a marker in accordance with claim 32 wherein:
said one or more materials comprise a soft amorphous magnetic material;
and said first processing step comprises annealing said soft amorphous magnetic material in a first annealing state at a temperature and for a time sufficient to at least substantially crystallize a region of said soft amorphous magnetic material, whereby said crystallized region forms said second component of said marker element, and an uncrystallized bulk region of said soft amorphous magnetic material forms said first component of said marker element.

39. A method of making a marker in accordance with claim 38 wherein:
said soft amorphous magnetic material comprises a transition metal-metalloid composition.

40. A method of making a marker in accordance with claim 39 wherein:
said soft amorphous transition metal-metalloid composition is essentially given by the formula $Co_{39.5}Fe_{39.5}Si_{2.1}B_{18.9}$.

41. A method of making a marker in accordance with claim 39 wherein:
said transition metal-metalloid composition comprises a transition metal which represents 60%-90% of said composition.

42. A method of making a marker in accordance with claim 41 wherein:
said transition metal-metalloid composition comprises one or more transition metals selected form the group comprising Fe, Co, and Ni.

43. A method of making a marker in accordance with claim 42 wherein:
said transition metal-metalloid composition is essentially given by the formula $Co_{74.26}Fe_{4.74}Si_{2.1}B_{18.9}$.

44. A method of making a marker in accordance with claim 43 wherein:
said time over which said first annealing stage is conducted is within a range of about 15 min. to about 60 min.;
and said temperature at which said first annealing stage is conducted is about 380° C.

45. A method of making a marker in accordance with claim 44 wherein:
said second processing step comprises: annealing of said soft amorphous magnetic material in a second annealing stage to establish domain walls in said marker element, said domain walls remaining in a pinned state during the time from when the applied field passes through the preselected offset field value toward and until the applied field reaches said predetermined threshold value, said second annealing stage being conducted at a temperature of about 400° C. and for a time of about 5 minutes.

46. A method of making a marker in accordance with claim 45 wherein:
said first processing step includes one of applying a DC field of about 60 Oe to said amorphous magnetic material and contacting said amorphous magnetic material with a multipole magnet.

47. A method of making a marker in accordance with claim 46 wherein:
said first and second annealing stage are each carried out in an environment consisting essentially of one of air, nitrogen and mixtures thereof.

48. A method of making a marker in accordance with claim 38 wherein:
said time over which said first annealing stage is conducted is within a range of about 2 minutes to 120 minutes and the temperature at which said first annealing stage is conducted is within a range of about 350° C. to 450° C.;
and said second processing step comprises: annealing of said soft amorphous magnetic material in a second annealing stage, said second annealing stage being conducted for a time within a range of about 1 minute to 5 minutes and at a temperature within a range of about 400° C. to 420° C.

49. A method of making a marker in accordance with claim 38 wherein:
said second processing step comprises: annealing said soft amorphous magnetic material in a second annealing stage at a temperature and for a time so as to establish domain walls in said marker, said domain walls remaining in a pinned state during the time from when the applied field passes through the preselected offset field value toward and until the applied field reaches said predetermined threshold value.

50. A method of making a marker in accordance with claim 38 wherein:
said first processing step includes applying a DC magnetic field along the length of said soft amorphous magnetic material.

51. A method of making a marker in accordance with claim 38 wherein:
said first processing step contacting said soft amorphous magnetic material with a multipole magnet.

52. A method of making a marker in accordance with claim 32 wherein:
a first one of said materials comprises a soft amorphous magnetic material;
a second one of said materials comprises a semi-hard or hard magnetic material;
and said first processing step comprises integrally depositing said second one of said materials on said first one of said materials.

53. A method of making a marker in accordance with claim 32 wherein:
the thickness of said second component is less than about 1 um.

54. A method of making a marker in accordance with claim 32 wherein:
said marker element when in said active state has domains whose walls are in a pinned state and remain in a pinned state during the time from when the applied field passes through the preselected offset field value toward and until the applied field reaches the predetermined threshold value at which the walls are released from the pinned state causing said regenerative step change in magnetic flux, the walls returning to the pinned state at the time when the applied field reaches the preselected offset field value after passing through the predetermined threshold value;
and said marker element when in said deactivated state has domains whose walls are inhibited from assuming the pinned state.

55. A method for detecting the presence of an article in an interrogation zone comprising the steps of:
generating an applied alternating magnetic interrogation field in the interrogation zone, the magnitude of said interrogation field in said interrogation zone exceeding a predetermined threshold value;

securing a marker to said article, the marker comprising: a) a marker element including first and second integral components, said first component comprising a soft magnetic material and said second component comprising a hard or semi-hard magnetic material; b) said marker element having an active state wherein said marker element exhibits a hysteresis characteristic upon being subjected to said applied alternating magnetic field such that the magnetic flux of said marker element undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value; c) said marker element having a deactivated state wherein said marker exhibits a different hysteresis characteristic from the hysteresis characteristic exhibited by said marker element in the active state; d) said second component of said marker element having an activating state which places said marker element in said active state and a deactivating state which places said marker in said deactivated state; whereby the marker element is switched between said active state and said deactivated state by switching said second component between said activating state and said deactivating state, respectively;

and detecting the presence of said marker when said marker is in the interrogation zone while the marker element is in the active state by detecting perturbations of the interrogation field.

56. A method of making a deactivatable reactivatable electronic article surveillance system marker comprising:
a) heating a marker element comprising a soft amorphous magnetic material to form a part of said soft amorphous magnetic material into a hard or semi-hard component;
b) applying a sufficient DC magnetic field to the marker element to place the hard or semi-hard component in a first magnetic state; and
c) heating the marker element to cause the marker element, when said hard or semi-hard component is in the first magnetic state, to exhibit a hysteresis characteristic upon being subjected to an applied alternating magnetic interrogating field, such that the magnetic flux of said marker element undergoes substantially no change during the time from when the magnitude of the applied field passes through a preselected offset field value toward and until the magnitude of the applied field reaches a predetermined threshold value, undergoes a regenerative step change at the time when the applied field reaches the predetermined threshold value, and undergoes a gradual change during the time from when the applied field passes through the predetermined threshold value toward and until the applied field reaches the preselected offset field value;
whereby the marker is deactivated by placing the hard or semi-hard component in a second magnetic state and reactivated by returning said hard or semi-hard component to the first magnetic state.

57. A method of making a marker in accordance with claim 56 wherein:
said step of applying a DC field occurs concurrently with or subsequent to said step of heating said marker element to form a part of said soft amorphous magnetic material into said hard or semi-hard component.

58. A method of making a marker in accordance with claim 57 wherein:
said step of heating said marker element to cause said marker element to exhibit said hysteresis characteristic occurs subsequent to said step of applying said DC field to said marker element and includes establishing domain walls in said marker element which remain in a pinned state during the time from when the applied field passes through the preselected offset field value toward and until the applied field reaches said predetermined threshold value.

59. A method of making a marker in accordance with claim 58 wherein:
said step of heating said marker element to form a portion of said soft amorphous magnetic material into said hard or semi-hard component occurs for a time sufficient to at least substantially crystallize a region of said soft amorphous magnetic material, said crystallized region forming said hard or semi-hard component.

60. A method of making a marker in accordance with claim 59 wherein:
said soft amorphous magnetic material comprises a transition metal-metalloid composition.

61. A method of making a marker in accordance with claim 60 wherein:
said step of heating said marker element to form a part of said soft amorphous magnetic material into said hard or semi-hard component is conducted for a time within a range of 15 minutes to 60 minutes and at a temperature of about 380° C.;
said step of heating said marker element to cause said marker element to exhibit said hysteresis characteristic is conducted at a temperature of about 400° C. and for a time of about 5 minutes;
and said step of applying a DC field to said marker element includes one of applying a DC field of about 60 Oe to said amorphous magnetic material and contacting said amorphous magnetic material with a multipole magnet.

62. A method of making a marker in accordance with claim 60, wherein:
said step of heating said marker element to form a part of said soft amorphous magnetic material into said hard or semi-hard component is conducted for a time within a range of about 2 minutes to 120 minutes and at a temperature within a range of about 350° C. to 450° C.;
and said step of heating said marker element to cause said marker element to exhibit said hysteresis characteristic is conducted at a time within a range of about 1 minute to 5 minutes and at a temperature in a range of about 400° C. to 420° C.

63. A method of making a marker in accordance with claim 61 wherein:
said transition metal-metalloid composition is essentially given by the formula $CO_{39.5}Fe_{39.5}Si_{2.1}B_{18.9}$.

64. A method in accordance with claim 56 wherein:

soft amorphous magnetic material is selected from the following group of compositions:

$Co_{90}Zr_{10}$
$Co_{90}Zr_8Nb_2$
$Co_{90}Zr_5Nb_5$.

65. A method of making a marker in accordance with claim 56 wherein:

said marker element when said hard or semi-hard component is in the first magnetic state, has domains whose walls are in a pinned state and remain in a pinned state during the time from when the applied field passes through the preselected offset field value toward and until the applied field reaches the predetermined threshold value at which the walls are released from the pinned state causing said regenerative step change in magnetic flux, the walls returning to the pinned state at the time when the applied field reaches the preselected offset field value after passing through the predetermined threshold value;

and said marker element, when said hard or semi-hard component is in the second magnetic state, has domains whose walls are inhibited from assuming the pinned state.

66. A marker for use in an electronic article surveillance system in which an applied alternating magnetic field is established in a surveillance zone and an alarm is activated when a predetermined perturbation to the field is detected, said marker comprising:

a) a marker element including first and second integral components, said first component comprising a soft magnetic material and said second component comprising a hard or semi-hard magnetic material;

b) said marker element having an active state wherein said marker element exhibits a hysteresis characteristic upon being subjected to an applied alternating magnetic field such that the magnetic flux of said marker element undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value;

c) said marker element having a deactivated state wherein said marker element exhibits a different hysteresis characteristic from the hysteresis characteristic exhibited by said marker element in the active state;

d) said second component of said marker element having an activating state wherein said second component is substantially demagnetized which places said marker element in said active state and a deactivating state wherein said second component is substantially magnetized which places said marker element in said deactivated state;

whereby said marker element is switched from said active state to said deactivated state by switching said second component from said activating state to said deactivating state.

67. A method of making a marker for use in an EAS system comprising the steps of a) selecting a marker element comprising a soft amorphous magnetic material as a base material;

b) heating the base material at a temperature in a range from about 350° C. to about 450° C. for a time in a range from about 2 minutes to 120 minutes to form an integral hard or semi-hard crystallized layer on the soft amorphous magnetic material;

c) applying a DC magnetic field of sufficient magnitude to at least substantially magnetize the crystallized layer in a longitudinal direction; and d) heating the marker element at a temperature in a range of about 400° C. to 420° C. for a time in a range of about 1 minute to 5 minutes to cause said marker element, when in an active state and subjected to an applied alternating magnetic field, to exhibit a hysteresis characteristic such that the magnetic flux of said marker element undergoes substantially no change during the time from when the applied field passes through a preselected offset field value toward and until the applied field reaches a predetermined threshold value, undergoes a regenerative step change at the time when the applied field reaches the predetermined threshold value and undergoes a gradual change during the time from when the applied field passes through the predetermined threshold value toward and until the applied field reaches the preselected offset field value.

68. A method of making a marker in accordance with claim 67 in which the predetermined threshold value depends upon the coercivity of the crystallized layer.

69. A method of making a marker in accordance with claim 67 in which the predetermined threshold value depends upon the magnitude of the DC magnetic field applied to the crystallized layer.

* * * * *

UNITED STATES PATENT AND TRADEMARK OFFICE
CERTIFICATE OF CORRECTION

PATENT NO. : 5,313,192
DATED : May 17, 1994
INVENTOR(S) : Wing Ho, et al

It is certified that error appears in the above-indentified patent and that said Letters Patent is hereby corrected as shown below:

```
Col. 4, line 51 delete "," (first Occurrence)
Col. 8, line 5 change "apply" to --applying--
Col. 8, line 10 change "a" to --as--
Col. 17, line 31 change "form" to --from--
Col. 17, line 64 change "stage" to --stages--
Col. 18, line 31 after "step" insert --includes--
```

Signed and Sealed this

Sixth Day of September, 1994

Attest:

BRUCE LEHMAN

Attesting Officer        Commissioner of Patents and Trademarks